(12) United States Patent
Elgazzar et al.

(10) Patent No.: US 7,822,596 B2
(45) Date of Patent: Oct. 26, 2010

(54) FLEXIBLE DISPLAY TRANSLATION

(75) Inventors: Mohamed Elgazzar, Redmond, WA (US); Bernhard Kohlmeier, Woodinville, WA (US); Refaat Issa, Sammamish, WA (US); Mark Webber, Seattle, WA (US); Matthew Crinklaw, Sammamish, WA (US); Kathryn Richardson, Sammamish, WA (US); Francois Liger, Redmond, WA (US); Majd Abbar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 956 days.

(21) Appl. No.: 11/294,231

(22) Filed: Dec. 5, 2005

(65) Prior Publication Data

US 2007/0130563 A1   Jun. 7, 2007

(51) Int. Cl.
G06F 17/28 (2006.01)
G06F 17/20 (2006.01)
G06F 17/27 (2006.01)
G06F 3/00 (2006.01)
G06F 3/048 (2006.01)
G06F 9/44 (2006.01)

(52) U.S. Cl. .............. 704/2; 704/3; 704/8; 704/9; 715/700; 715/703; 715/715; 715/766; 715/793; 715/804; 715/826; 717/105; 717/120

(58) Field of Classification Search .......... 717/104, 717/112; 715/700, 703, 715, 766, 793, 804, 715/826; 704/1–9
See application file for complete search history.

(56) References Cited

U.S. PATENT DOCUMENTS

| 4,599,612 | A | * | 7/1986 | Kaji et al. ............... 345/635 |
| 5,541,837 | A | * | 7/1996 | Fushimoto .............. 704/2 |
| 5,809,493 | A | * | 9/1998 | Ahamed et al. ......... 706/52 |
| 5,822,720 | A | * | 10/1998 | Bookman et al. ........ 704/3 |
| 5,987,402 | A | * | 11/1999 | Murata et al. ........... 704/2 |
| 6,047,252 | A | * | 4/2000 | Kumano et al. ......... 704/2 |
| 6,119,078 | A | * | 9/2000 | Kobayakawa et al. ... 704/3 |
| 6,219,646 | B1 | * | 4/2001 | Cherny ................... 704/277 |
| 6,385,568 | B1 | | 5/2002 | Brandon |
| 6,516,296 | B1 | * | 2/2003 | Fuji ........................ 704/3 |
| 6,738,083 | B2 | * | 5/2004 | Allen ...................... 715/781 |
| 7,480,863 | B2 | * | 1/2009 | Branson et al. .......... 715/711 |
| 2001/0056352 | A1 | * | 12/2001 | Xun ........................ 704/277 |

(Continued)

FOREIGN PATENT DOCUMENTS

WO    WO 01/82111 A2    11/2001

OTHER PUBLICATIONS

BabelFish for Outlook 2000/2002/2003 by Dmitry Streblechenko, 2001 (http://www.dimastr.com/babelfish/).*

(Continued)

*Primary Examiner*—Wei Y Zhen
*Assistant Examiner*—Charles Swift
(74) *Attorney, Agent, or Firm*—Wolf, Greenfield & Sacks, P.C.

(57) ABSTRACT

A user interface for displaying source data and a translated copy of a segment of the source data is provided. The user interface includes a first display portion for displaying at least a subset of the source data on the display. The user interface includes a second display portion for displaying a translated copy of a selected segment of source data on the display.

18 Claims, 9 Drawing Sheets

U.S. PATENT DOCUMENTS

| | | | |
|---|---|---|---|
| 2002/0036661 A1* | 3/2002 | Minoura et al. | 345/807 |
| 2004/0066414 A1* | 4/2004 | Czerwinski et al. | 345/781 |
| 2004/0167784 A1 | 8/2004 | Travieso | |
| 2004/0205671 A1* | 10/2004 | Sukehiro et al. | 715/532 |
| 2004/0207666 A1* | 10/2004 | Hally et al. | 345/854 |
| 2004/0244146 A1* | 12/2004 | Park | 16/239 |
| 2005/0138567 A1* | 6/2005 | Smith et al. | 715/763 |
| 2005/0206627 A1* | 9/2005 | Simmons | 345/179 |
| 2005/0216918 A1* | 9/2005 | Kuraishi | 719/316 |
| 2005/0283466 A1* | 12/2005 | Dettinger et al. | 707/3 |

OTHER PUBLICATIONS

Paganelli et al, "Intelligent Analysis of User Interactions with Web Applications", Jan. 2002, ACM, pp. 111-118.*

"Downloads—GuruNet—PC Advisor," *Downloads*, <http://www.pcadvisor.co.uk/downloads/index.cfm?categoryid=1474&itemid=6738&pg=17&sortby=name> [retrieved Jul. 6, 2006].

"Google Tutor & Advisor>>Blog Archive>>Google Translation On-the-Fly," *Google Tut?or Tutorials, Tips and Advice for Google Users*, May 12, 2005, <http://googletutor.com/2005/05/12/translation-on-the-fly/> [retrieved Jul. 5, 2006].

"gTranslate 0.1b," *Firefox Add-ons*, Jul. 1, 2005, <https://addons.mozilla.org/firefox/918/history/> [retrieved Jul. 6, 2006].

First Office Action mailed Feb. 5, 2010 in Chinese Patent Application No. 200680045256.8.

* cited by examiner

FLEXIBLE DISPLAY TRANSLATION

BACKGROUND

Generally described, computer systems can include user interfaces and/or content in a variety of languages. For example, a software application or operating environment may be localized to a specific language of its intended recipient. Similarly, content, such as Web pages, may also be created in a variety of languages. In some scenarios, however, users may wish to interact with user interfaces and/or content in multiple languages. Dependent on the user's language skill level, translation services, such as a real-time translation service, may be beneficial to a user.

One approach to providing translation services allows users to enter specific words or phrases into a text box for translation. After the user enters the words or phrases into the text box, the entry may be submitted and a translation displayed. Another approach allows users to select specific words within a document to be translated. A translated version of the selected word is displayed to a user. Nevertheless, current translation approaches are limited to providing specific words or phrases. These approaches typically do not provide a contextual view of the original and translated versions to facilitate user comprehension.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In accordance with an aspect of the invention, a method for displaying data is provided. The method can be implemented in a computer system which includes a display. Source data which corresponds to a first language is obtained. A subset of the source data is displayed on the display. A selection of a segment of the displayed subset of the source data is obtained. A translated copy of the selected segment of the source data is displayed on the display. The translated copy of the displayed selected segment corresponds to a second language.

In accordance with an aspect of the invention, a method for displaying data is provided. The method can be implemented in a computer system which includes a display. A subset of source data which corresponds to a first language is displayed on the display. A selection of a segment of the displayed subset of the source data is obtained. A translated copy of the selected segment of the source data is obtained. The translated copy of the displayed selected segment corresponds to a second language. Further, the translated copy of the selected segment of the source data is displayed on the display.

In accordance with an aspect of the invention, a computer-readable medium having computer-executable components for displaying data is provided. The computer-executable components include a source-data portion for displaying at least a subset of source data on a display. The source data corresponds to a first language. Additionally, the computer-executable components include a translated-data portion for displaying a translated copy of a selected segment of the source data on the display. The translated copy of the source data corresponds to a second language.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention is directed toward systems and methods for displaying a translated copy of source data. More specifically, in accordance with the present invention, a segment of source data is translated and displayed such that both the segment of source data and the translated copy of the segment are visible on a display. Additionally, various user controls can be provided to facilitate user interaction with the source data and the translated copy of the source data. Although the present invention will be described with relation to illustrative user interfaces and operating environments, one skilled in the relevant art will appreciate that the disclosed embodiments are illustrative in nature and should not be construed as limiting.

Figure 1:
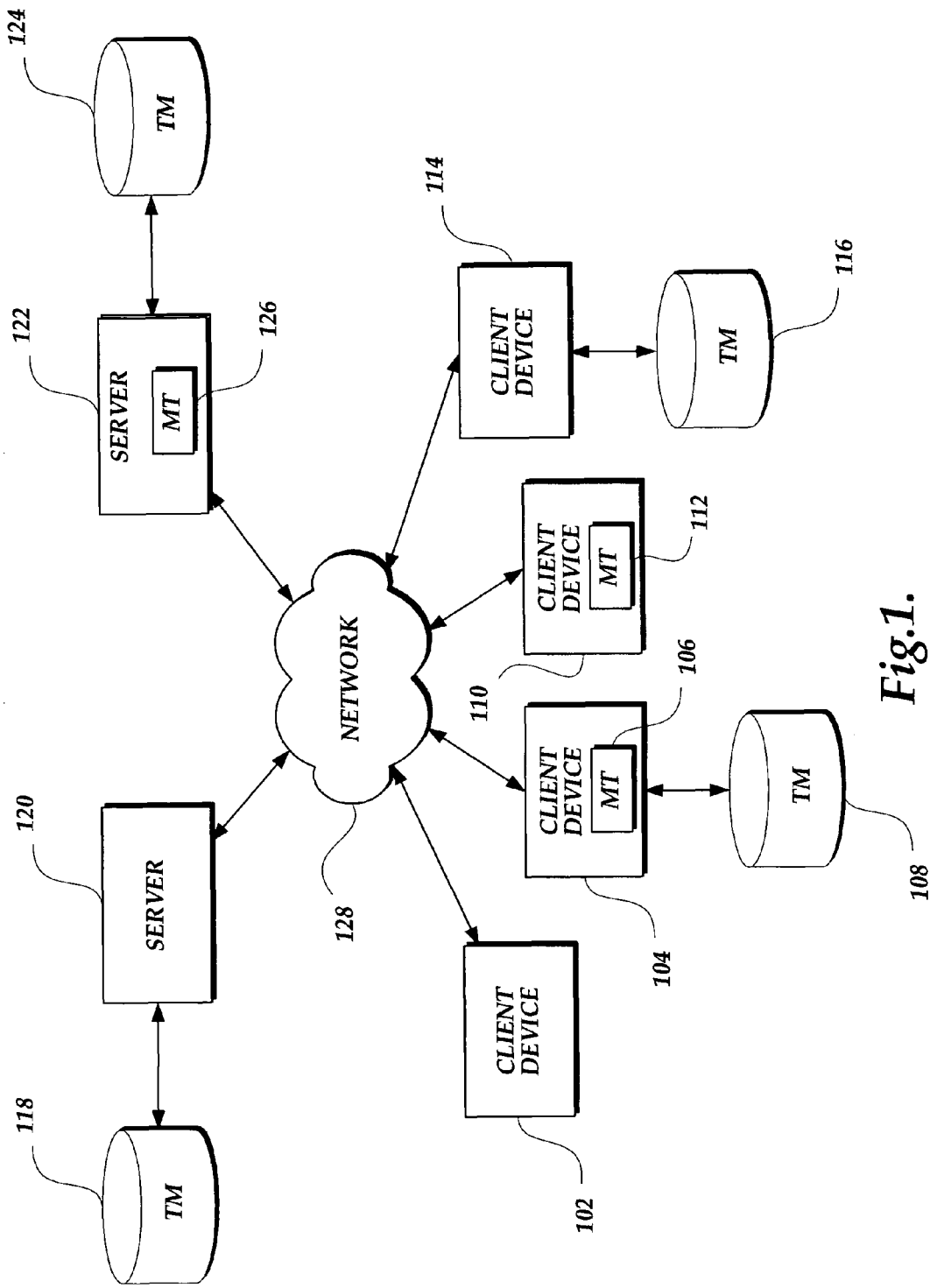
FIG. 1 is a block diagram of an illustrative operating environment including a number of client devices and content providers in accordance with an aspect of the present invention.

With reference now to FIG. 1, an exemplary operating environment 100 includes one or more client devices 102, 104, 110, and 114 operable to communicate via a communication network 128, such as the Internet or an intranet. In an illustrative embodiment, the one or more client devices 102, 104, 110, and 114 include an operating system and software applications, such as a browser software application, to facilitate communication via the communication network 128. Other applications available on the client devices 102, 104, 110, and 114 may include a word processing program, a spreadsheet program, a drawing program, or any other program that displays information to a user. Further, in an illustrative embodiment, the one or more client devices 102, 104, 110, and 114 include a mouse, a keyboard, and a display. An exemplary operating environment also includes one or more servers 120 and 122 operable to communicate with the client devices 102, 104, 110, and 114 via the communication network 128. The one or more servers 120 and 122 are operable to translate source data received from the client devices 102, 104, 110, and 114 and to transmit information and translations to the client devices 102, 104, 110, and 114.

One skilled in the relevant art will appreciate that the client devices 102, 104, 110, and 114 illustrated in FIG. 1 can correspond to a variety of devices, such as personal computers, server computers, handheld computers, laptop devices, network computers, minicomputers, mainframe computers, mobile computers, mobile telephones, televisions, dumb terminals, or any device capable of displaying information to a user. Furthermore, one skilled in the relevant art will appreciate that the illustrative servers 120 and 122 can also correspond to a variety of devices, including personal computers, server computers, handheld computers, laptop devices, network computers, minicomputers, mainframe computers mobile computers, mobile telephones, cable head-end systems, or any device capable of providing a translation service. One skilled in the relevant art will appreciate that such devices include at least one processor and computer-readable storage medium having computer-executable components. One skilled in the relevant art will appreciate that the communication network 128 may be the Internet, an intranet, an extranet, a satellite network, or any other communications medium.

In an illustrative embodiment, source data on a client device 102, 104, 110, and 114 corresponds to a first language which a user desires to translate to a second language. A translation memory 108, 116, 118, and 124 can be used to provide the translation. Translation memories 108, 116, 118, and 124 store translated copies of segments of source data, along with the corresponding segments of source data which can be matched against selected segments of source data that the user desires to translate. If a match is found, the translation memory 108, 116, 118, or 124 provides a translated copy of the segment. In an illustrative embodiment, machine translation 106, 112, and 126 can be used to translate segments of source data. Machine translation involves the use of computer hardware or software to translate from one language to another.

As illustrated in FIG. 1, in an illustrative embodiment, a client device 114 can retrieve copies of previously translated segments from a translation memory 116. Further, a client device 110 can utilize a device or software capable of machine translation 112 to provide translations. In an illustrative embodiment, a client device 104 may have local access to both machine translation 106 and a translation memory 108. Further, a client device 102 may not be operable to translate segments locally. In such a case, the client device 102 can receive translations from the one or more servers 120 and 122. Further, although the translation memories 108 and 116 are illustrated as separate devices from the client devices 104 and 114, one skilled in the relevant art will appreciate that a client device and a translation memory may be a single computing device. Still further, translation memories 108 and 116 may correspond to local storage or distributed storage via the communication network 128.

In an illustrative embodiment, a server 120 and 122 can utilize a translation memory 118 or 124 to provide the client devices 102, 104, 110, and 114 with translations. Additionally or alternatively, a server 122 can utilize a device or software capable of machine translation 126 to provide translations. Although server 122 can utilize either a translation memory 124 or machine translation 126, one skilled in the relevant art will appreciate that a server may only have access to machine translation. Further, although the translation memories 118 and 124 are illustrated as separate devices from the one or more servers 120 and 122, server 122 and translation memory 124, and/or server 120 and translation memory 118, may be a single computing device. Still further, translation memories 118 and 124 may correspond to local storage or distributed storage via the communication network 128. The machine translation 126 may be provided by a single device or software program or may be provided by a distributed system of devices. Further, one skilled in the relevant art will appreciate that the one or more servers 120 and 122 may advertise their translation capabilities as a service.

In an illustrative embodiment, a client device 102, 104, 110, or 114 utilizes its local resources to generate various user interfaces that include information, such as text or images of text. The information may correspond to information generated by software applications or an operating system from data stored locally on the client device 102, 104, 110, or 114, such as a icons, images, or text. As will be explained below, after generating the information, the client device 102, 104, 110, or 114 obtains a selection of a segment of the information and provides a user with a corresponding translation of the selected segment. In an alternate embodiment, and with reference to FIGS. 2 or 3, the client device 102, 104, 110, or 114 can obtain at least a portion of the information from a remote source, such as servers 120 or 122.

Figure 2:
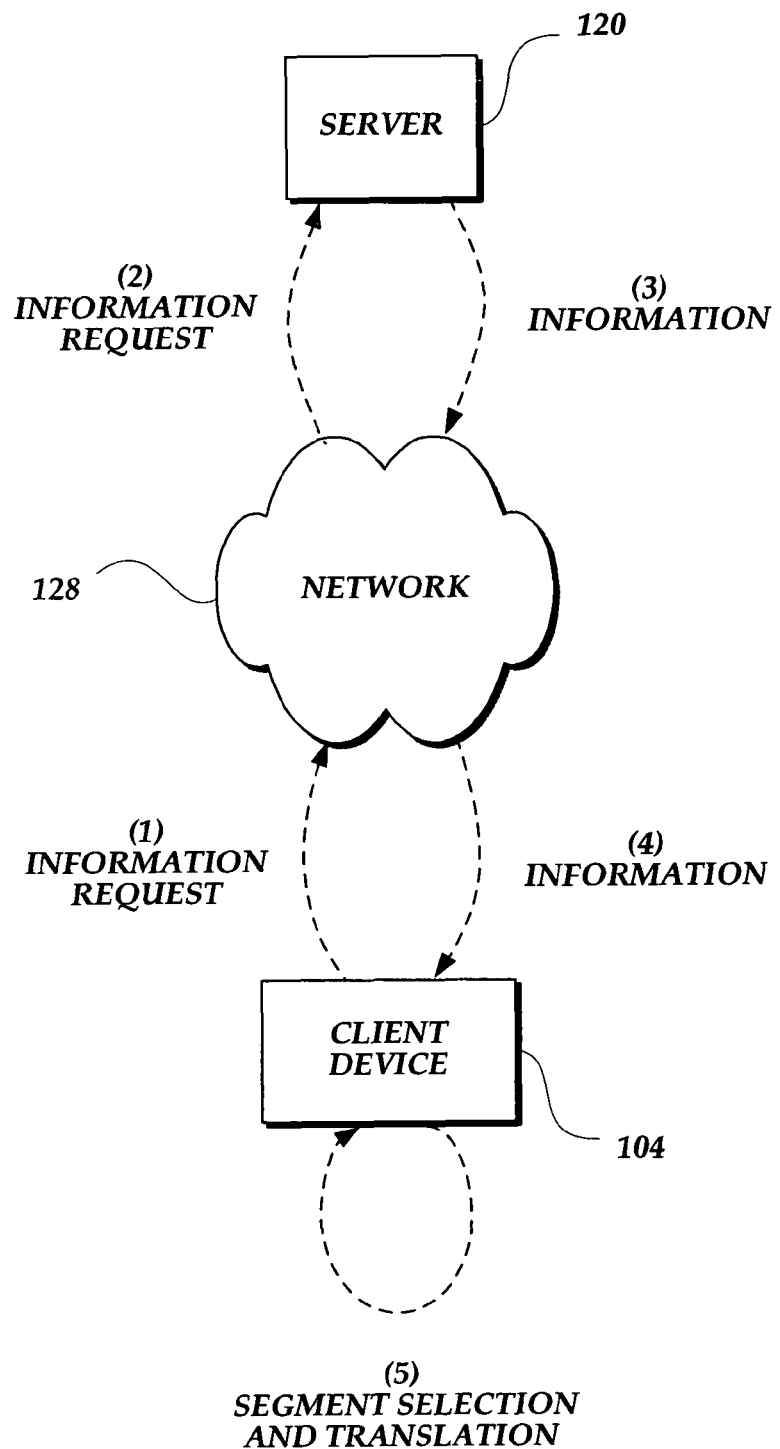
FIG. 2 is a block diagram of the operating environment of FIG. 1 depicting the transmission of information requests and the translation of the information by a client device in accordance with an aspect of the present invention.

With reference now to FIG. 2, in an illustrative embodiment 200, a client device 104 can generate a request for information. The information request is transmitted via a communication network 128 to a server 120. In an illustrative embodiment, the information request corresponds to a request for source data which is created in a first language, such as a web page or text file. The information request can include a specification of a language. Alternatively, the language can be deduced or default to a first language. A server 120 transmits information via a communication network 128 to a client device 104. After obtaining the information, the client device 104 obtains a selection of a segment of information and provides a user with a corresponding translation of the selected segment. One skilled in the art will appreciate that client device 104 can translate segments of source data that are stored locally and that need not have been transmitted from a server 120.

Figure 3:
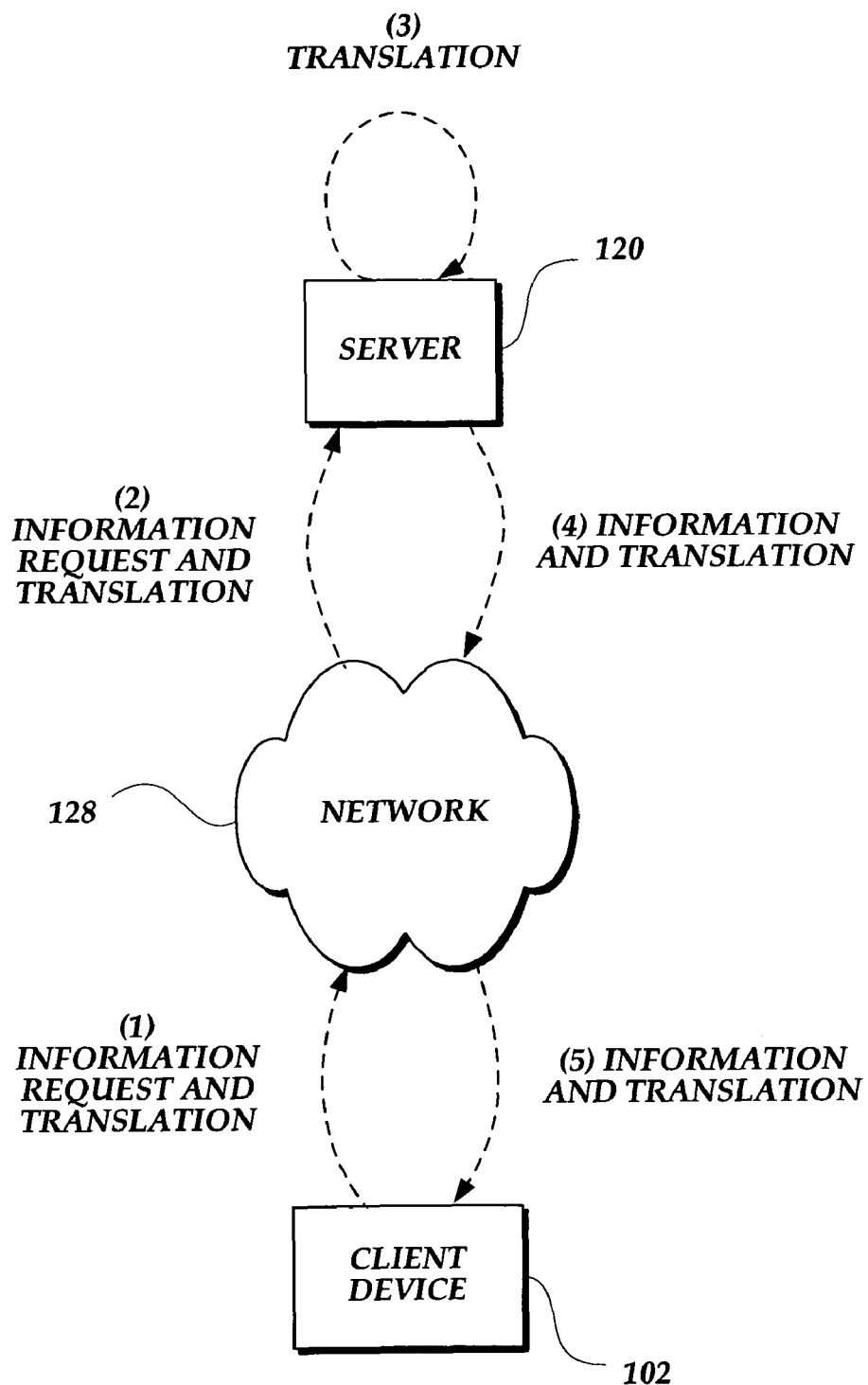
FIG. 3 is a block diagram of the operating environment of FIG. 1 depicting the transmission of information requests from a client device and the transmission of the requested information and translated information by a content provider in accordance with an aspect of the present invention.

With reference to FIG. 3, in another illustrative embodiment 300, a client device 102 can generate a request for information and a translation of the requested information. The request for information and translation is transmitted via a communication network 128 to a server 120. After the server 120 performs the requested translation, the information and translation is transmitted via a communication network 128 to a client device 102. The information transmitted by a server 120 can include a document containing source data in a first language, such as a web page or text file. In an illustrative embodiment, the translation transmitted by a server 120 can correspond to a localized version of the document. In an illustrative embodiment, a translation transmitted by a server 120 can include a translation of one or more segments previously received from a client device 102. After obtaining the information, the client device 102 obtains a selection of a segment of information and provides a user with a corresponding translation of the selected segment.

One skilled in the art will appreciate that translations can be provided through a service. Further, this service may run on a client device 104, 110, and 114, or a server 120 and 122. In an illustrative embodiment, the service is distributed across any combination of client devices 104, 110, and 114 and/or servers 120 and 122. One skilled in the relevant art will appreciate that any source language can be translated into any target language.

Figure 4:
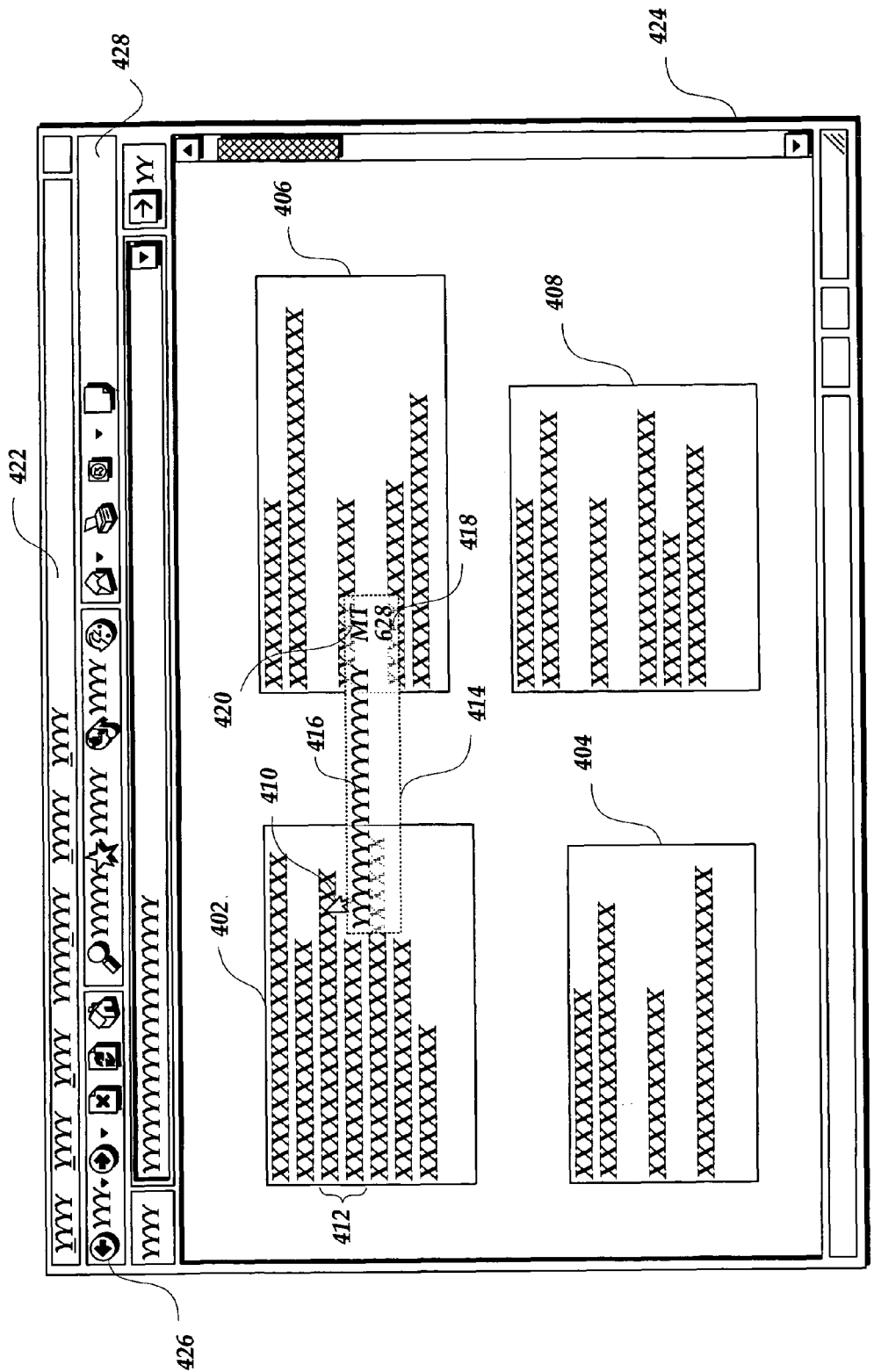
FIG. 4 is a block diagram of a user interface including a first display portion containing source data and a second display portion containing a translated copy of a selected segment of the source data in accordance with an aspect of the present invention.

FIG. 4 depicts an illustrative user interface 424 in which a translated copy 416 of a selected segment 412 of source data may be displayed in an adjacent display 414. The illustrative user interface 424 may correspond to displayed content, such as a web page 400 with one or more content portions 402, 404, 406, and 408. In an illustrative embodiment, the content portions 402, 404, 406, and 408 include one or more identifiable segments. A segment can correspond to a grouping of words, such as a sentence. Additionally, a segment can correspond to a grouping of sentences or paragraphs. Still further, a segment can correspond to a grouping of words and images. Still further, a segment can correspond to a portion of an image, a single image, or multiple images. In this embodiment, the client devices 102, 104, 110, and 114 or the servers 120 and 122 can use optical-character recognition to convert the images to text data.

In an illustrative embodiment, a segment 412 of source data is selected by the user. The segment 412 may be selected by manipulation of various user input devices, such as a mouse cursor 410, keyboard, touch screen, or the like. The segment 412 may be selected by selecting a portion of the segment, such as a single word. A user may select a segment by dragging the mouse cursor 410 in such a manner as to highlight an area of the user interface 424, selecting the segment with a mouse manipulation, "hovering" over a portion of the segment with a mouse, or the like. Based on the selected segment 412, a translated copy 416 of the segment is displayed on the display 414. The display 414 may appear transparent, semi-transparent, opaque, or have a colored background. In an illustrative embodiment, the translated copy 416 of the selected segment 412 of source data may be displayed adjacent to the selected segment 412 of source data.

In an illustrative embodiment, the display 414 can include additional information related to the selected segment 412 and/or translated copy 416. For example, an identification of a type of translation 420 may be displayed. Exemplary embodiments may utilize machine translation and a translation memory to perform translations. The letters "MT" 420 can be used to denote that machine translation was used to translate the segment 412. In an illustrative embodiment, the letters "TM" can be used to denote that a translation memory was used to provide the translation 416. In other embodiments, letters, numbers, symbols, pictures, or other indicia can be used to denote the type of translation 420. In an illustrative embodiment, the user can be given an opportunity to provide feedback on the usefulness of the translation. For example, a dialog box may be displayed which provides the user with a mechanism, such as a hyperlink, to provide feedback on the translation.

In an illustrative embodiment, a confidence value 418 may be displayed to the user in the display 414. A confidence value 418 represents to a user the usefulness of the translation 416, especially in machine-translation embodiments. Confidence values are useful to the user in that the user can configure the system to only provide translations 416 above a certain threshold. In an illustrative embodiment, a range of numbers from 0 to 1000 can be used to provide the confidence value 418. In other embodiments, a different range of numbers, letters, symbols, pictures or other indicia can be used to provide the confidence value 418.

The display 414 can provide a translation of any user-interface element displayed to the user. For example, the display 414 can display translations corresponding to buttons 426 on the toolbar 428 or from items on the menu bar 422. If a menu is selected and a drop-down list is displayed, the display 414 can provide translations for the list of options. In an illustrative embodiment, translations 416 of user-interface elements are provided as the elements are moused over.

In an illustrative embodiment, the user interface 424 is displayed by a client device 102, 104, 110, and 114 running the Microsoft Windows™ operating system. Further, as the mouse cursor 410 passes over various portions of the user interface 424, the Windows Accessibility™ functionalities provides the relevant segment 412 of source data. The Windows Localization Platform™ provides a translation framework which can be leveraged by calling the application programming interface ("API") provided by the Windows Localization Platform™ to perform a translation or transliteration (or combination of both) of the selected segment 412. In an illustrative embodiment, a display of the translated or transliterated segment 416 is displayed within a semi-transparent display 414, which enables the user to simultaneously see both the source data 412 and its translation 416.

In an illustrative embodiment, a client device 102, 104, 110, or 114 can request translation of a segment of data from a server 120 and 122. In other embodiments, a client device 102, 104, 110, or 114 can request translation of more than one segment of data. For example, if the client device 102, 104, 110, or 114 is displaying a document in a word processing program, the client device 102, 104, 110, or 114 can request a translation of the entire document. If the client device 102, 104, 110, or 114 requests translation of the document, the client device 102, 104, 110, or 114 may hide the translation from the user and only display segments of translated data 416 as they are needed. In an illustrative embodiment, the client device 102, 104, 110, or 114 can request a translation of all text and user-interface elements displayed to the user.

In an illustrative embodiment, a user configures the settings for the display 414 by using a set of dialog boxes. For example, the user may configure the display 414 to display translations 416 in a certain target language. In an illustrative embodiment, the operating system running on the client device 102, 104, 110, or 114 determines the target language for translations 416. In an illustrative embodiment, an audio rendition of the source data or translation 416 may be provided through the use of Text-to-Speech technology. Further, in an illustrative embodiment running on Microsoft Windows™, the display 414 may appear after a user selects an icon in the Windows™ tray.

Figure 5:
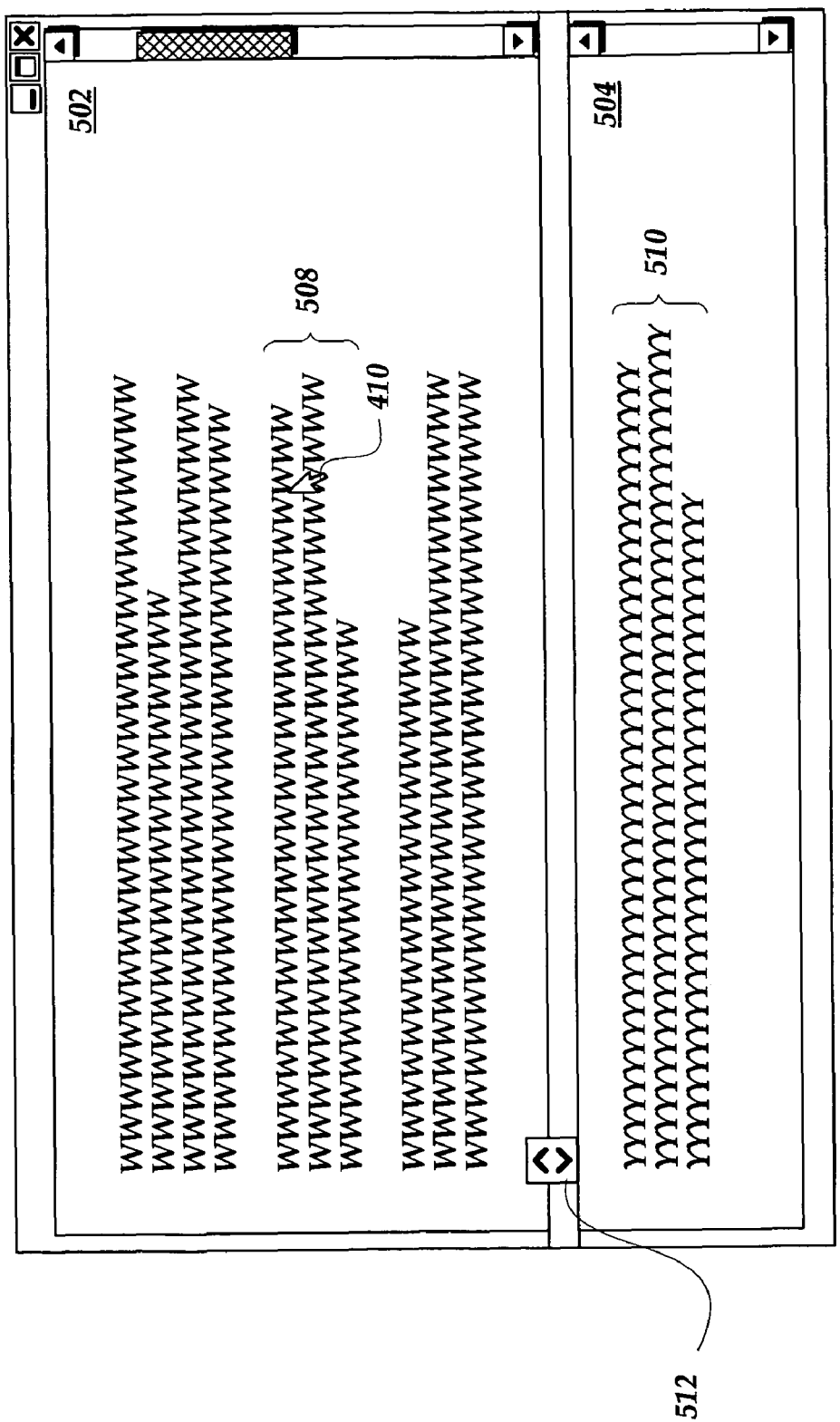
FIG. 5 is a block diagram of a user interface including a first display portion containing source data that is vertically arranged above a second display portion which contains a translated copy of a selected segment of the source data in accordance with an aspect of the present invention.

With reference now to FIG. 5, an illustrative user interface 500 for displaying source data in a first language and a translated copy 510 of a selected segment 508 of the source data in a second language will be described. The illustrative user interface 500 includes a first portion 502 of the display for displaying a subset of the source data and a second portion 504 of the display for displaying a translated copy 510 of a selected segment 508 of source data. In an illustrative embodiment, the translated copy 510 of the selected segment 508 corresponds to a segment 508 pointed at by a mouse cursor 410. As the mouse cursor 410 moves over segments of source data, the second portion 504 of the display always displays a translated copy 510 of the selected segment 508 of source data. In an alternative embodiment, the user may utilize a keyboard or other input device to select segments to be translated. Additionally, the selected segment 508 can be highlighted on the display 502.

In an illustrative embodiment, the source data corresponds to a first language and the translated copy 510 of the selected segment 508 of source data corresponds to a second language. In an alternative embodiment, the source data may correspond to multiple languages. For example, a user in Germany may send an e-mail to a user in France who adds comments and then forwards the e-mail to a user in the United States.

In an illustrative embodiment, the user interface 500 also includes a display control 512. A user can obtain a selection of the display control 512. In response to the selection of the display control 512, at least a subset of a translated copy of the source data can be displayed in the first portion 502 of the display. Further, in response to the selection of the display control 512, the selected segment 508 of the source data can be displayed in the second portion 504 of the display. The display control 512 may be a spin button or a flip button. In an illustrative embodiment, the first portion 502 of the display may include a background color which is indicative of the first language as an original language of the source data. By selecting the display control 512, a user can switch the source data and the translated copy of the source data. This is very useful if machine translation was used and the user wants to find the best view that helps him or her to comprehend the information presented.

Figure 6:
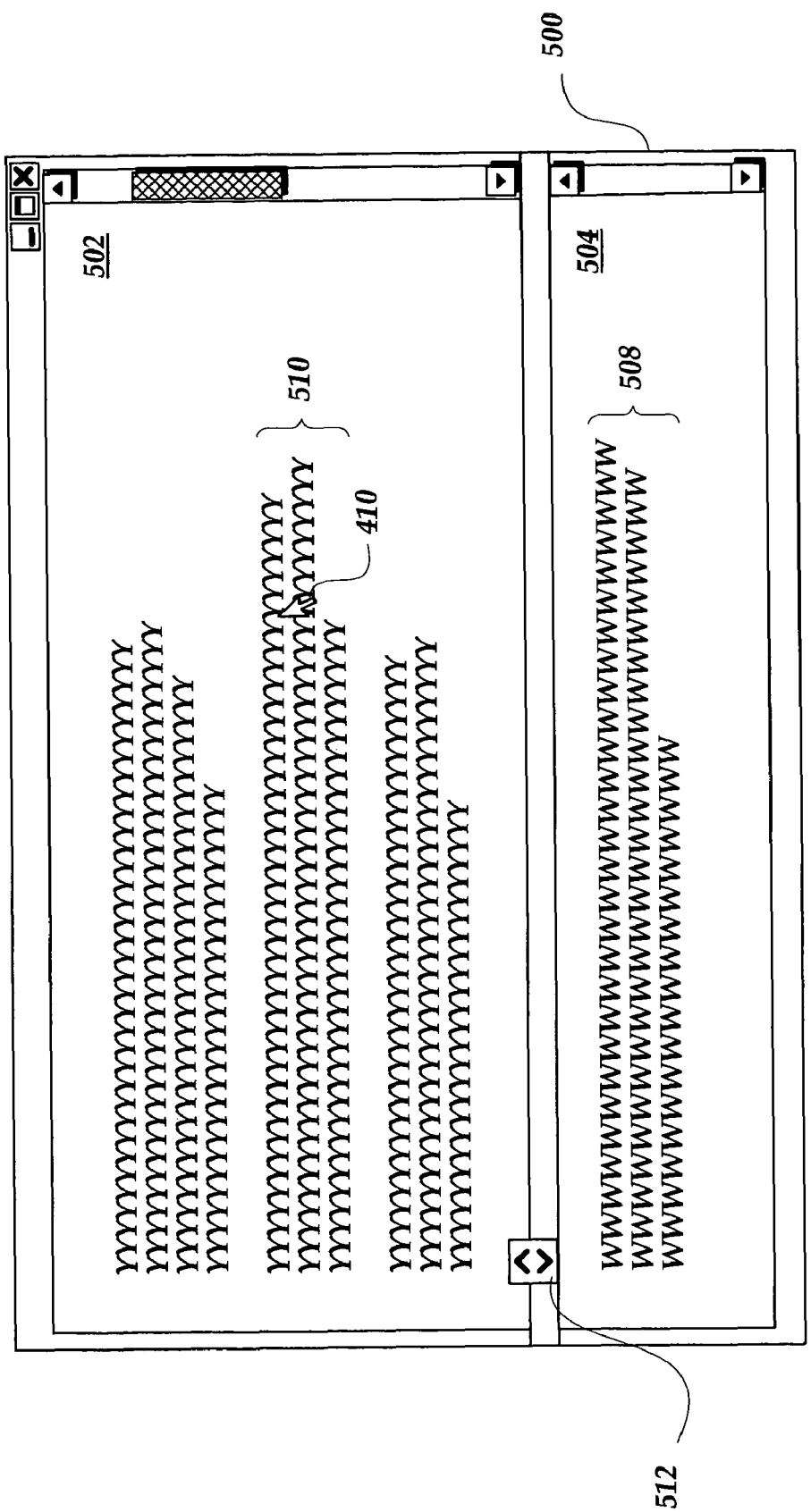
FIG. 6 is a block diagram of the user interface of FIG. 5 wherein at least a subset of a translated copy of the source data is displayed in the first display portion and a selected segment of source data is displayed in the second display portion in accordance with an aspect of the present invention.

FIG. 6 depicts the illustrative user interface 500 of FIG. 5 after a user has selected the display control 512. In an illustrative embodiment, selection of the display control 512 switches the source data and translated copy of the source data such that the data in the first display portion 502 is conveyed in the second language. The second display portion 504 displays a translated copy 508 of a selected segment 510 of data from the first display portion 502 in the first language of FIG. 5. In an illustrative embodiment, the selected segment 510 corresponds to a segment pointed at by the mouse cursor 410. In alternative embodiments, segments may be selected using a keyboard or other input device. For example, the user may select a segment on a touch-screen by pressing their finger against a segment on the screen. The user can switch back to the embodiment depicted in FIG. 5 by selecting the display control 512.

Figure 7:
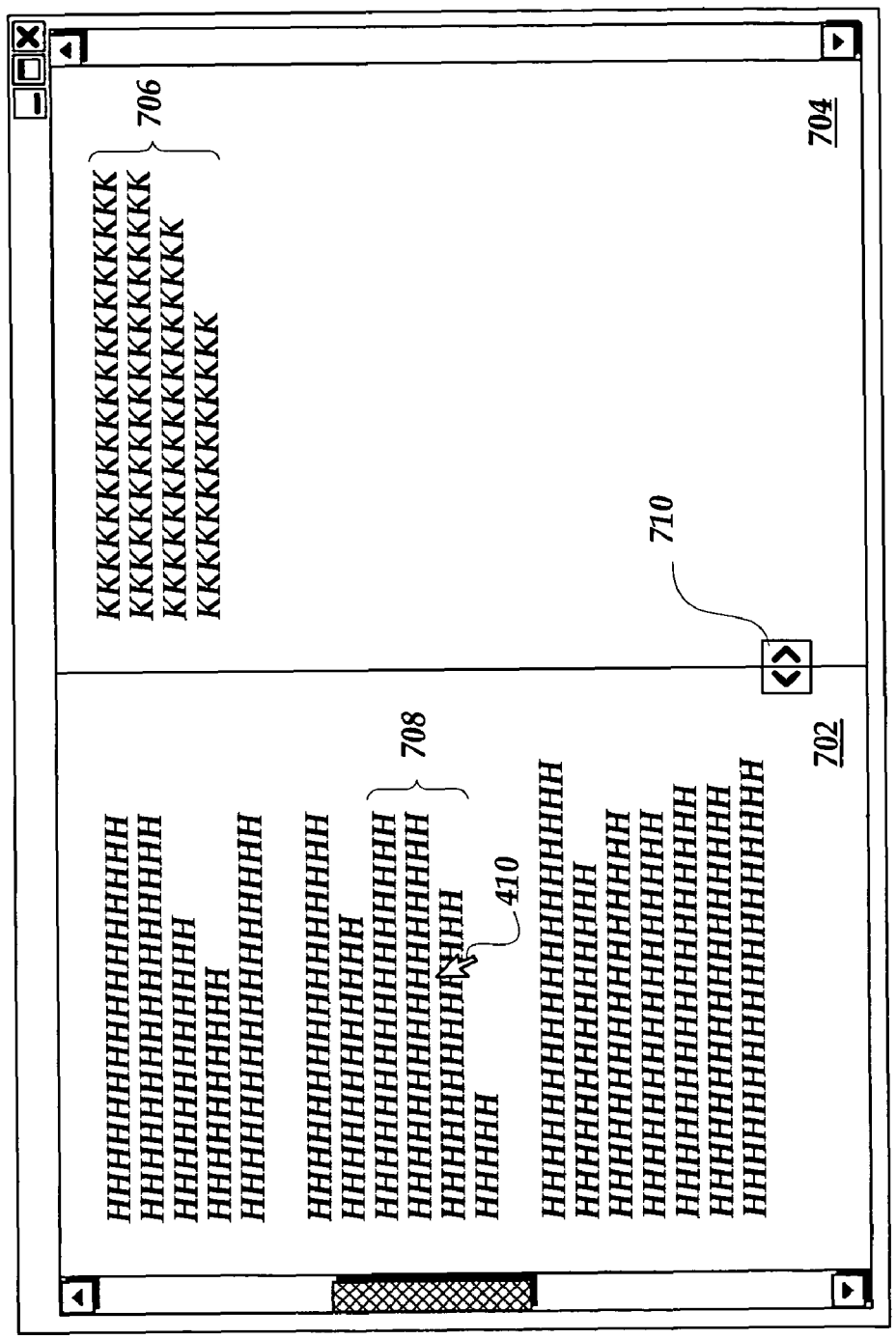
FIG. 7 is a block diagram of a user interface including a first display portion containing source data that is horizontally adjacent to a second display portion which contains a translated copy of a selected segment of the source data in accordance with an aspect of the present invention.

With reference now to FIG. 7, an alternate user interface 700 for displaying source data in a first language and a translated copy 706 of a selected segment 708 of the source data in a second language will be described. The illustrative user interface 700 includes a first portion 702 of the display for displaying a subset of the source data in a first language and a second portion 704 of the display for displaying a translated copy 706 of the selected segment 708 of source data. As opposed to FIG. 5, the first portion 702 and second portion 704 are horizontally adjacent. As the selected segment 708 changes, the corresponding translated copy 706 of the segment changes as well.

In an illustrative embodiment, the translated copy 706 of the selected segment 708 corresponds to a segment 708 pointed at by a mouse cursor 410. As the mouse cursor 410 moves over segments of source data, the second portion 704 of the display always displays a translated copy 706 of the selected segment 708 of source data. In an alternative embodiment, the user may utilize a keyboard or other input device to select segments to be translated. The subset of source data displayed in the first portion 702 of the display may correspond to multiple languages.

In an illustrative embodiment, the user interface 700 includes a display control 710. Further, in an illustrative embodiment, a user can obtain a selection of the display control 710. In response to selection of the display control 710, at least a subset of a translated copy of the source data can be displayed in the first portion 702 of the display. Further, in response to the selection of the display control 710, the selected segment 708 of the source data can be displayed in the second portion 704 of the display. In an illustrative embodiment, the display control 710 may be a spin button or a flip button. In an illustrative embodiment, the first portion 702 of the display may include a background color which is indicative of the first language as an original language of the source data.

In an illustrative embodiment, by dragging and dropping one of the display portions 702 or 704, a user may switch from the user interface 700 depicted in FIG. 7, where the first portion 702 of the display is horizontally adjacent to the second portion 704 of the display, to the user interface 500 depicted in FIG. 5, where the first portion 502 of the display is vertically arranged above the second portion 504 of the display. The drag-and-drop functionality allows a user to configure the user interface in a manner that best allows the user to comprehend the information presented.

Figure 8:
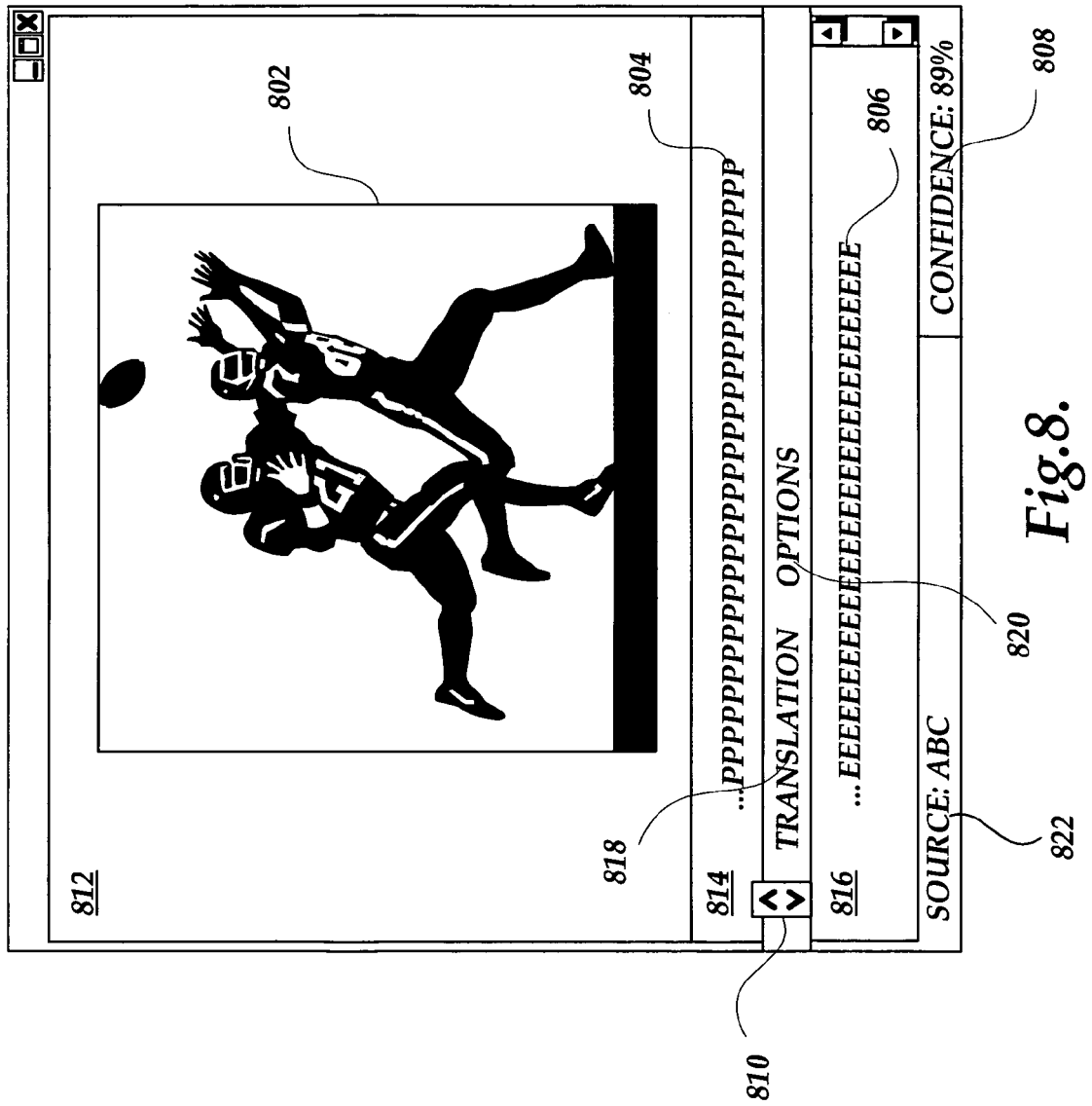
FIG. 8 is a block diagram of a user interface including a first display portion containing multimedia, a second display portion containing text associated with the multimedia, and a third display portion containing a translation of the text in accordance with an aspect of the present invention.

With reference now to FIG. 8, an illustrative multimedia application 800 for displaying some associated text 804 in a first language and a translation of the text 806 in a second language will be described. In an illustrative embodiment, the user interface 800 can be displayed by a client device 102, 104, 110, or 114 receiving information from a broadcast source, such as a cable head-end system. The multimedia application 800 includes a first display portion 812 for displaying a multimedia display 802, such as streaming media or video playback. The multimedia application 800 also includes a second display portion 814 for displaying some text 804 associated with the multimedia display 802, such as close captioning, enhanced broadcasts, and the like. Additionally, the multimedia application 800 includes a third display portion 816 for displaying a translated copy 806 of the text 804. As the multimedia display 802 and second display portion 814 generate content, the third display portion 816 provides a translated copy of a segment of the audio 804.

In an illustrative embodiment, the user interface 800 includes a "translation" menu 818 and an "options" menu 820. The "translation" menu 818 may allow the user to choose the target language. Further, the user may select the trust-level of the translation source. For example, the user may select to receive translations from all sources or only a select subset that the user trusts. In an illustrative embodiment, the "options" menu 820 may allow the user to configure the user interface 820. For example, the user may be able to change the font for the text or configure the amount of text displayed. In an illustrative embodiment, the user can configure the user interface 800 such that any of display portions 812, 814, and 816 are hidden from view. Further, the user may be given the opportunity to provide feedback on the usefulness of the translation. In an illustrative embodiment, the source 822 of the translation can also be displayed.

In an illustrative embodiment, a confidence value 808 may be displayed to the user to convey to the user the usefulness of the translation. A high confidence value typically correlates to a more useful translation. In an illustrative embodiment, a display control 810 enables a user to switch the source language and the target language. For example, if the user desires to listen to the audio in the language displayed in the third display portion 816, the user can activate the display control 810. In an illustrative embodiment, the language displayed in the third display portion 816 switches with the language displayed in the second display portion 814 when the display control 810 is activated.

Figure 9:
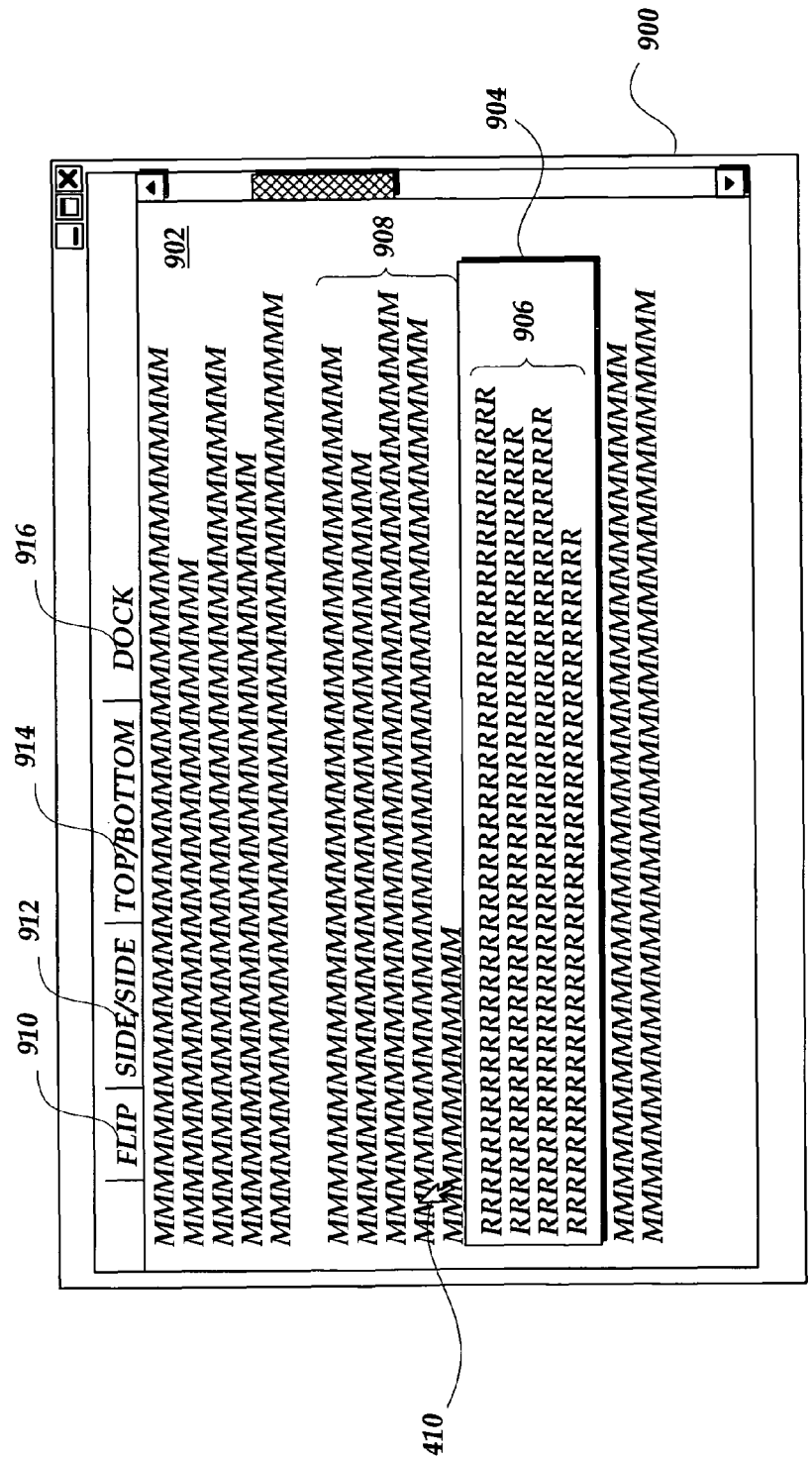
FIG. 9 is a block diagram of a user interface including a first display portion containing source data and a second display portion containing a translated copy of a selected segment of source data that floats over the first display portion in accordance with an aspect of the present invention.

With reference now to FIG. 9, an illustrative user interface 900 for displaying source data in a first language and a translated copy 906 of a selected segment 908 of the source data in a second language will be described. The illustrative user interface 900 includes a first portion 902 of the display for displaying a subset of the source data in a first language and a second portion 904 of the display for displaying a translated copy 906 of the selected segment 908 of source data. In an illustrative embodiment, the translated copy 906 of the selected segment 908 corresponds to a segment 908 pointed at by a mouse cursor 410. As the mouse cursor 410 moves over segments of source data, the second portion 906 of the display follows and always displays a translated copy 906 of the segment 908 pointed at by the mouse cursor 410. In an alternative embodiment, the user may utilize a keyboard or other input device to select segments to be translated. In an illustrative embodiment, the floating display portion 904 may scroll down the screen at some pre-configured rate. Further, in an illustrative embodiment, the floating display portion 904 may appear transparent, semi-transparent, opaque, or include a colored background. One skilled in the art will appreciate that the second portion 904 of the display essentially floats over the first portion 902 of the display and is always visible. The subset of source data displayed in the first portion 902 of the display may correspond to multiple languages. In an illustrative embodiment, the first portion 902 of the display encompasses the entire display and the second portion 904 of the display is located within a portion of the first portion 902 of the display.

In an illustrative embodiment, the user interface 900 includes display controls 910, 912, 914, and 916 which allow a user to configure the user interface 900. For example, the user interface 900 can include a display control 910 that, when selected by a user, displays at least a subset of a translated copy of the source data in the first portion 902 of the display while simultaneously displaying the selected segment 908 of source data in the second portion 904 of the display. In an illustrative embodiment, selecting display control 910 switches the source and target text and enables the user to find the best view that helps the user comprehend the information presented. The illustrative user interface 900 can also include a display control 912 that, when selected, re-configures the first portion 902 of the display so that it is horizontally adjacent to the second portion 904 of the display. Further, the illustrative user interface 900 can also include a display control 914 that, when selected, re-configures the first portion 902 of the display so that it is vertically arranged above the second portion 904 of the display. In an illustrative embodiment, the user interface 900 includes a display control 916 that, when selected, re-configures the second portion 904 of the display such that it is docked and no longer follows the mouse cursor 410. By selecting display control 916, the user may dock the second portion 904 of the display anywhere on the display.

The illustrative user interfaces 500, 700, and 900 can be implemented by any program capable of displaying information to a user, such as a word processing program, web browser, help window, or operating system. In an illustrative embodiment, user interfaces 500, 700, 800, and 900 can be configured to plug in to the user-interface metaphor of the program that is implementing the illustrative user interfaces 500, 700, 800, and 900. Further, in an illustrative embodiment, software applications may be launched with a source-data display portion and a translation display portion. In an illustrative embodiment, an application can be configured to contain a source-data display portion and a translation display portion after the application is launched.

While illustrative embodiments have been illustrated and described, it will be appreciated that various changes can be made therein without departing from the spirit and scope of the invention.

The invention claimed is:

1. In a computer system including a display, executed by at least one processor, a method for displaying data comprising:
    displaying a subset of source data on a first portion of the display, wherein the source data corresponds to a first language;
    obtaining user input comprising an indication of a portion of the user interface, wherein the indicated portion of the user interface is identified by the position of a mouse cursor hovering without further user input to select the indicated portion of the user interface;
    Obtaining a segment of the source data associated with the indicated portion of the user interface;
    obtaining a translated copy of the selected segment of the source data, wherein the translated copy of the displayed selected segment corresponds to a second language;
    displaying a translated copy of the selected segment of the source data on a second portion of the display;
    obtaining an indication of a user selection of a display control; and
    in response to the user selection of the display control:
    replacing the displaying on the first portion of the display of the subset of source data with the displaying on the first portion of the display of a translated copy of the subset of source data, wherein the translated copy of the subset of source data corresponds to the second language;
    obtaining a selection of a segment of the translated copy of the subset of source data on the first portion of the display, wherein the selection is identified by the position of a mouse cursor hovering without further user input to select the indicated portion of the user interface; and
    displaying on the second portion of the display a segment of the subset of source data corresponding to the selected segment of the translated copy of the subset of source data.

2. The method as recited in claim 1, wherein displaying the source data in the first portion of the display includes associating a background color to the first portion indicative of the first language as an original language of the source data.

3. The method as recited in claim 1, wherein the first portion of the display is vertically arranged above the second portion of the display.

4. The method as recited in claim 1, wherein the first portion of the display is horizontally adjacent to the second portion of the display.

5. The method as recited in claim 1, wherein the first portion of the display encompasses the entire display and where the second portion of the display is located within a portion of the first portion of the display.

6. The method as recited in claim 1, wherein a subset of the source data corresponds to a third language, the method further comprising:
    obtaining a selection of a segment of the source data corresponding to the third language;
    and displaying a translated copy of the selected segment of the source data in the second language.

7. The method as recited in claim 1, wherein displaying a translated copy of the obtained segment of the source data on the display includes displaying the translated copy of the obtained segment of the source data in a display adjacent to the obtained segment of the source data.

8. The method as recited in claim 7, wherein displaying a translated copy of the obtained segment of the source data on the display further includes
displaying an identification of a type of translation in the display adjacent to the obtained segment of the source data.

9. The method as recited in claim 8, wherein a type of translation corresponds to machine translation, the method further comprising displaying a confidence value of the translated copy of the obtained segment of the source data.

10. A computer system comprising:
a display; and
at least one processor configured to perform a method for displaying data, the method comprising:
displaying a subset of source data on a first portion of the display, wherein the source data corresponds to a first language;
obtaining user input comprising an indication of a portion of the user interface, wherein the indicated portion of the user interface is identified by the position of a mouse cursor hovering without further user input to select the indicated portion of the user interface;
Obtaining a segment of the source data associated with the indicated portion of the user interface;
obtaining a translated copy of the selected segment of the source data, wherein the translated copy of the displayed selected segment corresponds to a second language;
displaying the translated copy of the selected segment of the source data on a second portion of the display;
obtaining an indication of a user selection of a display control; and
in response to the user selection of the display control:
replacing the displaying on the first portion of the display of the subset of source data with the displaying on the first portion of the display of a translated copy of the subset of source data, wherein the translated copy of the subset of source data corresponds to the second language;
obtaining a selection of a segment of the translated copy of the subset of source data on the first portion of the display, wherein the selection is identified by the position of a mouse cursor hovering without further user input to select the indicated portion of the user interface; and
a segment of the subset of source data corresponding to the selected segment of the translated copy of the subset of source data.

11. The computer system as recited in claim 10, wherein the source data corresponds to data transferred from a communication network.

12. The computer system as recited in claim 10, wherein the source data corresponds to data stored on a local computing device.

13. A computer-readable storage medium having computer-executable instructions when executed, causes the computing system including a display to perform a method comprising:
displaying a subset of source data on a first portion of the display, wherein the source data corresponds to a first language;
obtaining user input comprising an indication of a portion of the user interface, wherein the indicated portion of the user interface is identified by the position of a mouse cursor hovering without further user input to select the indicated portion of the user interface;
Obtaining a segment of the source data associated with the indicated portion of the user interface;
obtaining a translated copy of the selected segment of the source data, wherein the translated copy of the displayed selected segment corresponds to a second language;
displaying a translated copy of the selected segment of the source data on a second portion of the display;
obtaining an indication of a user selection of a display control; and
in response to the user selection of the display control:
replacing the displaying on the first portion of the display of the subset of source data with the displaying on the first portion of the display of a translated copy of the subset of source data, wherein the translated copy of the subset of source data corresponds to the second language;
obtaining a selection of a segment of the translated copy of the subset of source data on the first portion of the display, wherein the selection is identified by the position of a mouse cursor hovering without further user input to select the indicated portion of the user interface; and
displaying on the second portion of the display a segment of the subset of source data corresponding to the selected segment of the translated copy of the subset of source data.

14. The computer-readable storage medium as recited in claim 13, wherein the source-data portion and the translated-data portion are arranged adjacent on the display.

15. The computer-readable storage medium as recited in claim 13, wherein the translated-data portion is arranged adjacent to the selected segment of the source data from the source-data portion.

16. The computer-readable storage medium as recited in claim 13, wherein the user interface elements correspond to an image, a button control, a toolbar control, a menu bar control, a text field, and/or a drop-down list.

17. The method as recited in claim 5, wherein the second portion of the display is semi-transparent.

18. The method as recited in claim 1, wherein the obtained segment of the source data is obtained through a functionality of an operating system on the computer system, the functionality providing text associated with a portion of a user interface.

* * * * *